United States Patent [19]

Hutter, III

[11] Patent Number: 4,822,656
[45] Date of Patent: * Apr. 18, 1989

[54] FIXTURE FOR SECURING AN ADHESIVE ATTACHMENT TO A SUBSTRATE

[75] Inventor: Charles G. Hutter, III, Carson City, Nev.

[73] Assignee: Physical Systems, Inc., Carson City, Nev.

[ * ] Notice: The portion of the term of this patent subsequent to May 26, 2004 has been disclaimed.

[21] Appl. No.: 911,075

[22] Filed: Sep. 24, 1986

Related U.S. Application Data

[63] Continuation of Ser. No. 772,610, Sep. 4, 1985, Pat. No. 4,668,546.

[51] Int. Cl.$^4$ .............................. B32B 1/00; B32B 7/06
[52] U.S. Cl. ........................................ 428/40; 156/71; 156/91; 156/247; 156/344; 248/205.3; 428/65; 428/99; 428/343
[58] Field of Search .................. 24/304, DIG. 11; 156/71, 91, 247, 344; 248/205.3–205.6; 428/40, 64, 65, 99, 174, 343; 269/287

[56] References Cited

U.S. PATENT DOCUMENTS

| | | |
|---|---|---|
| 2,092,341 | 9/1937 | De Vries . |
| 2,451,194 | 10/1948 | Braun ............................ 248/205 A |
| 2,557,434 | 6/1951 | Hoverder ........................ 248/205 A |
| 2,987,098 | 6/1961 | Daniel ................................. 156/94 X |
| 3,236,715 | 2/1966 | Gunderson . |
| 3,661,683 | 5/1972 | Engel et al. ....................... 156/94 X |
| 3,837,965 | 9/1974 | Mahon et al. ...................... 156/382 |
| 3,885,768 | 5/1975 | Frye ................................... 248/467 |
| 3,996,082 | 12/1976 | Leatherman . |
| 4,025,677 | 5/1977 | Belke ................................. 428/63 |
| 4,167,259 | 9/1979 | Bury ................................. 248/205 A |
| 4,302,492 | 11/1981 | Hutter .................................. 428/40 |
| 4,338,151 | 7/1982 | Hutter ................................ 156/344 |
| 4,390,576 | 6/1983 | Hutter .................................. 428/40 |
| 4,556,439 | 12/1985 | Bannink, Jr. . |

FOREIGN PATENT DOCUMENTS

| | | |
|---|---|---|
| 1418483 | 12/1975 | United Kingdom . |
| 1468030 | 3/1977 | United Kingdom . |

Primary Examiner—Robert A. Dawson
Attorney, Agent, or Firm—Kelly, Bauersfeld & Lowry

[57] ABSTRACT

An improved attachment fixture is provided for securely mounting an adhesive attachment such as a threaded screw, patch, or the like onto a substrate. The improved fixture, which is adapted for construction as a one-piece plastic molding, is temporarily secured to the substrate in a first position with the attachment substantially out of bearing engagement with the substrate and then switched to a second position applying a positive force urging the attachment into bearing engagement with the substrate. The fixture is allowed to remain in the second position for a period of time sufficient for curing of an adhesive material applied to the attachment/substrate interface, after which the fixture may be removed. In some forms, the improved fixture maintains the orientation of the attachment during movement into bearing engagement with the substrate thereby preventing uneven distribution of or uneven application of forces to the adhesive material. Additionally, the improved fixture can be designed for installation by use of automated or power tool equipment.

7 Claims, 3 Drawing Sheets

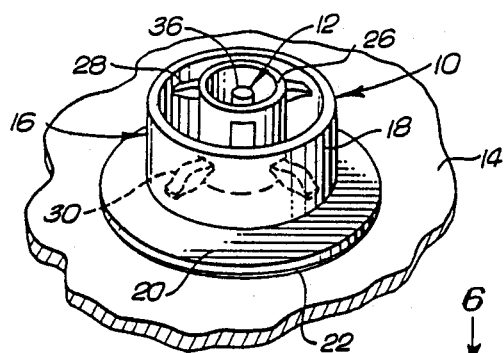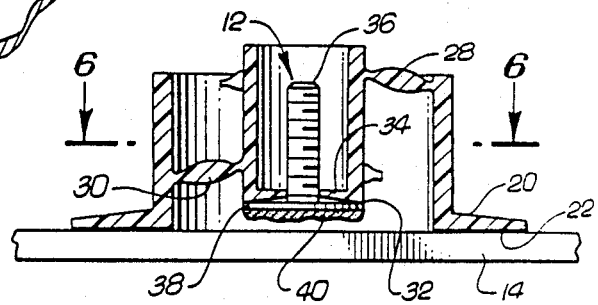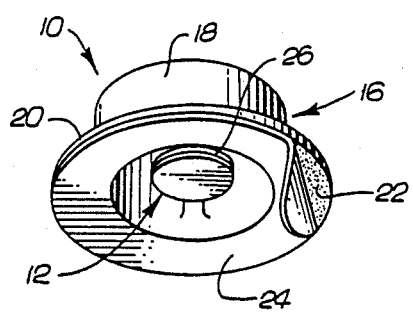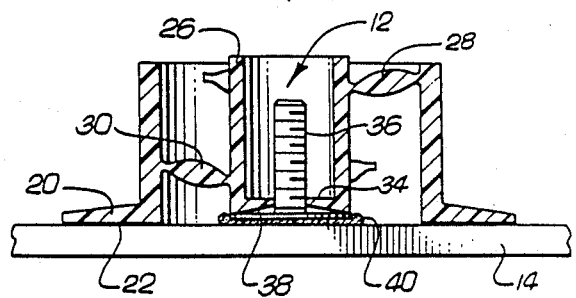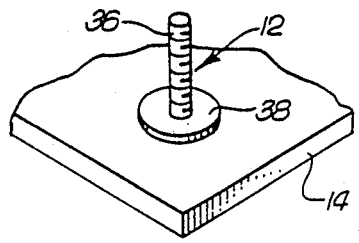

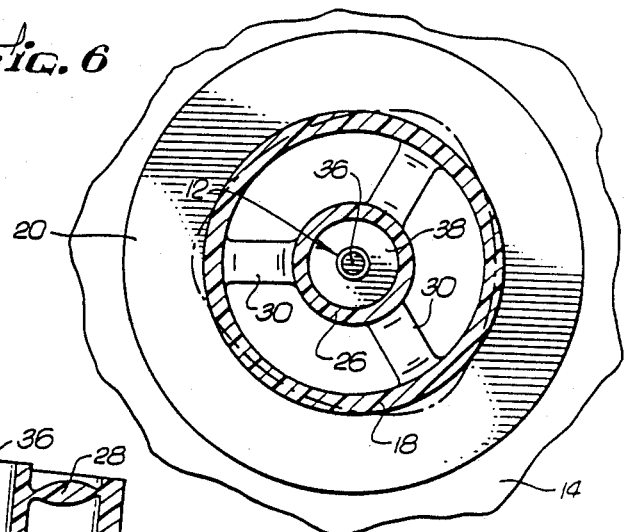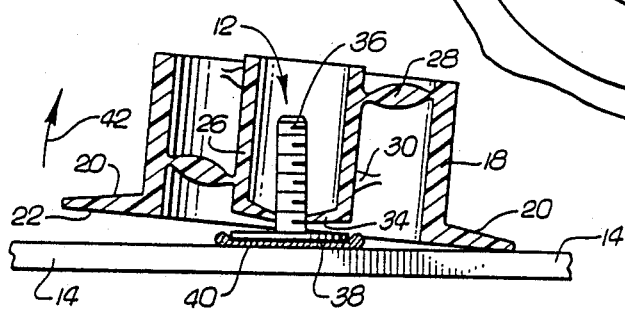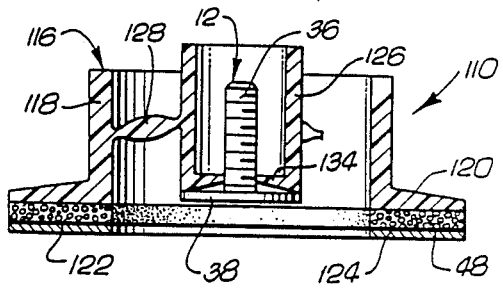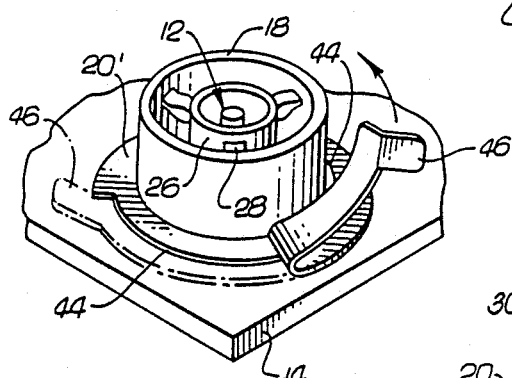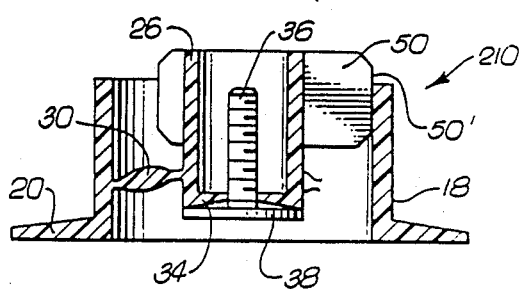

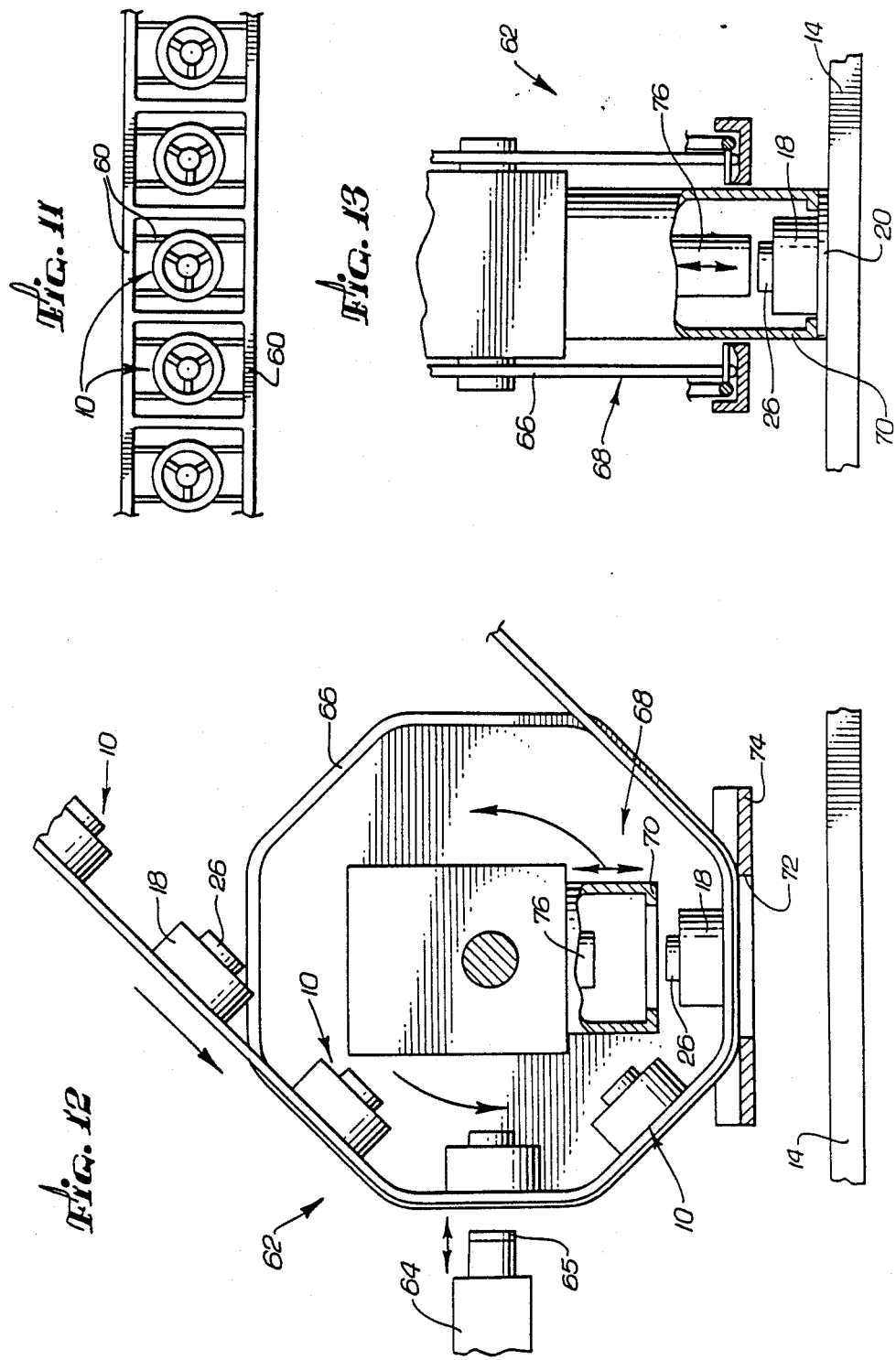

FIXTURE FOR SECURING AN ADHESIVE ATTACHMENT TO A SUBSTRATE

This is a continuation of application Ser. No. 772,610, filed Sept. 4, 1985 and now U.S. Pat. No. 4,668,546.

BACKGROUND OF THE INVENTION

This invention relates generally to adhesive attachment assemblies or fixtures and related methods for securing an adhesive attachment or the like onto a supporting surface or substrate. More specifically, this invention relates to improvements in such adhesive attachment assemblies or fixtures particularly of the type described and claimed in commonly assigned U.S. Pat. Nos. 4,302,492; 4,338,151; and 4,390,576.

In many instances, it is necessary or desirable to attach an element such as a patch, threaded screw, or the like onto a supporting substrate. For example, it may be necessary to apply a thin patch to the skin of an aircraft or to the hull of a boat to repair a hole therein. Alternately, it may be desirable to mount a threaded screw or other device onto a substrate, for example, the windshield of an automobile, without requiring a hole to be made in the substrate. In many such cases, it is necessary for the attachment to be located on the substrate with relatively high precision and further that a positive force be applied urging the attachment against the substrate for at least some minimum time period to allow, for example, curing of an adhesive material to achieve a relatively secure bond with the substrate.

In the past, any different clamp and fixture devices have been proposed for use in temporarily holding an adhesive attachment on the surface of a substrate during the cure time of an adhesive material. The majority of such clamp and fixture devices have required some form of mechanical connection to the substrate by means of screws or other mechanical fasteners, clamping jaws, etc. However, these devices are not suited for use with extended surface areas or fragile or thin-walled substrates within which surface interruptions to accommodate mechanical fastening are not possible or are undesirable. Other fixturing devices have been proposed which rely upon suction cups for holding an attachment in position on a substrate, but suction cup devices are limited to use with relatively smooth-surfaced substrates and further function to retain the attachment in place without exerting significant positive forces urging the attachment against the substrate. As a result, with suction cup devices, the adhesive material on the substrate can be unevenly distributed and/or cure with less than optimum bonding strength.

Improved devices are described and claimed in commonly assigned U.S. Pat. Nos. 4,302,492; 4,338,151; and 4,390,576. More particularly, these patents disclose attachment devices having a support fixture for temporary securing to the substrate by means of a pressure-sensitive adhesive or the like and force-bias or spring means for applying a force urging an attachment into positive bearing engagement with the substrate. The support fixture or a component thereof is movable between a first position with the adhesive attachment substantially out of bearing engagement with the substrate to a second position with the attachment pressed against the substrate. An over-center type annular spring plate constitutes the movable component in most of the described embodiments.

While the improved attachment devices disclosed in the above-referenced patents offer significant advantages in comparison with the previous art, they have required several component parts which are manufactured separately and then assembled, resulting in a relatively costly product for some applications. Moreover, the orientation of the adhesive attachment during support fixture movement between the first and second positions has not always maintained or assured optimal flush contact with the substrate, resulting in occasional angular tipping or cocking of the attachment causing uneven distribution and curing of adhesive material. Still further in attachment devices utilizing a resilient foam pad as the biasing force mechanism, the foam pad has exhibited a tendency to degrade in specialized high temperature environmenss, for example, when the attachment device and substrate are autoclaved to cure a specialized adhesive material.

There exists, therefore, a significant need for an improved, relatively simple, and relatively cost-efficient adhesive attachment and fixture therefor, wherein the fixture can be formed substantially as a one-piece construction of molded plastic or the like, wherein the fixture includes means for orienting the attachment device during movement into engagement with a substrate, and wherein the fixture can withstand relatively high temperature environments. The present invention fulfills these needs and provides further related advantages.

SUMMARY OF THE INVENTION

In accordance with the invention, an improved fixture is provided for quickly, easily, and accurately securing an attachment onto a substrate by means of an adhesive or the like. The fixture comprises a support frame adapted for high volume, relatively low cost production as a one-piece component, for example, molded plastic. The support frame is associated with connector means, such as a pressure sensitive adhesive, for temporary securement to the substrate and includes a retainer means for releasably carrying the attachment to be applied to the substrate. The support frame is movable from a first position carrying the attachment substantially out of bearing engagement with the substrate to a second position urging the attachment with a positive force into firm bearing contact with the substrate.

In one preferred form of the invention, the support frame comprises an outer support cylinder having a radially oriented flange at one end coated with a pressure-sensitive adhesive or the like for temporary securement to the substrate. The outer support cylinder is joined integrally by a plurality of spokes with an inner, preferably coaxial pressure sleeve, wherein the spokes project radially inwardly from the outer support sleeve and angularly in an axial direction away from the flange. The pressure sleeve in turn carries the retainer means which, in one form, comprises an inwardly radiating, yieldable annular lip for releasably supporting an attachment, such as a threaded screw, having an enlarged footplate to be adhesively attached to the substrate.

In use, an appropriate adhesive material is applied to the underside of the attachment footplate, or to the substrate, and the flange on the outer support cylinder is temporarily adhered to the substrate. The pressure sleeve is then pressed axially toward the substrate to move the spokes past an over-center condition thereby displacing the attachment from a first position substantially out of bearing contact with the substrate to a second position with the underside of the footplate engaging the substrate. The outer support cylinder and/or the pressure sleeve deform slightly from a cylindrical configuration during this movement but return elastically to substantially cylindrical geometries when the second position is reached to provide hoop stresses to the spokes for urging the attachment with a positive force toward the substrate.

Orientation of the attachment can be maintained relative to the substrate by maintaining sleeve orientation within the support cylinder during pressure sleeve movement toward the second position. More particularly, the support frame may further include guide means spaced axially from the spokes for cooperation with the spokes to maintain the pressure sleeve coaxially within the support frame. In one preferred form, the guide means comprises a second plurality of spokes which are desirably offset angularly relative to the remaining spokes to facilitate molding of the support frame as a one-piece component. Alternate guide means may include spacer fins or the like for maintaining coaxial spacing between the outer support cylinder and the pressure sleeve.

After the adhesive material has cured sufficiently, the support frame is removed from the substrate with the attachment releasing from the retainer means to remain in place on the substrate. In one form of the invention, support frame removal is facilitated by a score formed in the connector flange and associated with a pull tab sized for easy grasping and twisting motion to separate the connector flange from the substrate.

In accordance with further features of the invention, the improved fixture can be manufactured conveniently in multi-fixture magazines or continuous rolls with interconnecting runners to provide a plurality of fixtures which can be advanced serially to an installation head of automated or power-driven installation equipment. That is, the fixtures can be advanced automatically or semi-automatically into operative relation with a punch designed to separate the fixtures in sequence from the runners and to mount each fixture onto a substrate, followed by displacement of the pressure sleeve to advance the attachment into positive substrate engagement.

Other features and advantages of the invention will become more apparent from the following detailed description, taken in conjunction with the accompanying drawings, which illustrate, by way of example, the principles of the invention.

BRIEF DESCRIPTION OF THE DRAWINGS

The accompanying drawings illustrate the invention In such drawings:

FIG. 1 is a perspective view illustrating the top and one side of an improved attachment fixture embodying, in one form, the novel features of the invention;

FIG. 2 is a perspective view showing the bottom and one side of the attachment fixture of FIG. 1;

FIG. 3 is a perspective view illustrating a threaded screw attachment secured onto a substrate;

FIG. 4 is a fragmented vertical section illustrating the fixture of FIG. 1 temporarily mounted onto a substrate with a threaded screw attachment carried in a first position substantially out of bearing engagement with the substrate;

FIG. 5 is a fragmented vertical section similar to FIG. 4 but illustrating the fixture in a second position with the attachment urged into bearing engagement with the substrate;

FIG. 6 is a fragmented horizontal section taken generally on the line 6—6 of FIG. 4;

FIG. 7 is a vertical sectional view similar to FIG. 5 but illustrating removal of the fixture from the substrate and the attachment;

FIG. 8 is a perspective view similar to FIG. 1 but illustrating one alternative form of the invention;

FIG. 9 is a vertical sectional view similar to FIG. 4 but illustrating another alternative form of the invention;

FIG. 10 is another vertical sectional view similar to FIG. 4 but illustrating a further alternative form of the invention;

FIG. 11 is a plan view illustrating a plurality of the fixtures of FIG. 1 interconnected by runners as a continuous molding;

FIG. 12 is a diagrammatic view illustrating one form of an installation head for automated or power-tool installation of fixtures onto a substrate; and FIG. 13 is an enlarged fragmented elevational view illustrating a portion of the installation head of FIG. 12, and further depicting operation of the head for installing one of the fixtures onto the substrate.

DETAILED DESCRIPTION OF THE PREFERRED EMBODIMENTS

As shown in the exemplary drawings, an improved attachment fixture referred to generally by the reference numeral 10 is provided for quickly, easily, and securely mounting an adhesive attachment 12 (FIG. 3) onto a substrate 14. The improved fixture 10 is designed for temporary mounting onto the substrate 14 with the attachment 12 initially supported in a first position away from substantial bearing engagement with the substrate, whereupon a portion of the fixture 10 is movable quickly and easily to a second position carrying the attachment 12 into and urged with a positive force toward substantial bearing engagement with the substrate. The fixture securely holds the attachment 12 against the substrate for the cure time of an adhesive material at the attachment/substrate interface, after which the fixture is removable quickly and easily to leave the attachment securely in place.

The improved attachment fixture 10 of the present invention generally corresponds with and improves upon the attachment fixtures or assemblies described and claimed in commonly assigned U.S. Pat. Nos. 4,302,492; 4,338,151; and 4,390,576. More particularly, the improved fixture 10 comprises a support frame 16 adapted for convenient and cost-efficient, high volume manufacture as a one-piece component, for example, from molded plastic or the like. In preferred forms, the fixture 10 includes means for controlling the orientation of the adhesive attachment 12 during movement toward the substrate 14 and throughout the cure period of an adhesive material to insure substantially optimum adhesive bonding with the substrate, as will be described in more detail. Still further, in accordance with the present invention, the use of foam or resilient pads for urging the attachment against the substrate may be avoided, if desired, to permit use of the fixture in relatively high temperature environments, such as with autoclave curable adhesives and the like.

The improved attachment fixture 10 is shown in one preferred form in FIGS. 1-7. As shown, the support frame 16 of the fixture comprises an outer support cylinder 18 having a radially outwardly enlarged connector flange 20 at the lower axial end thereof. The illustrative outer support cylinder 18 and the connector flange 20 are formed integrally from a relatively lightweight molded plastic, such as polypropylene, polyvinyl chloride, polyethylene, acetyl copolymers, or any other suitable plastic material having at least a minor degree of structural resiliency. The connector flange 20 is sized to provide relatively broad surface contact area for contact with the substrate 14, as will be described, and can be formed with a thickness to conform readily with broadly curved or otherwise nonplanar surfaces, for example, the skin of an aircraft. The underside of the connector flange 20 is coated with a suitable adhesive layer 22 particularly such as a layer of a pressure-sensitive adhesive. A removable sheet of release paper 24 (FIG. 2) is provided as an overlay for the pressure-sensitive layer 22 and is easily stripped therefrom when the fixture is ready for use.

The support frame 16 of the fixture 10 further includes an inner pressure sleeve 26 supported generally coaxially within the outer support cylinder 18. As shown, this pressure sleeve 26 is connected integrally with the support cylinder 18 by axially spaced sets of spokes, with three spokes per set being shown in the illustrative drawings. More particularly, an upper set of equiangularly arranged spokes 28 and a lower set of equiangularly arranged spokes 30 extend between the cylinder 18 and sleeve 26, wherein the upper set of spokes is angularly misaligned relative to the underlying lower set to facilitate molding as a one-piece component.

In the normal position as shown in FIG. 4, the upper and lower spokes 28 and 30 extend from the support cylinder 18 in radially inward directions toward the pressure sleeve 26 with axial components of direction extending at least slightly away from the connector flange 20. Accordingly, each of the spokes 28 and 30 has a longitudinal length somewhat greater than the radial distance between the cylinder 18 and the sleeve 26. In this normal position, the spokes 28 and 30 support the pressure sleeve 26 in a first position with its lower axial end margin 32 spaced above the plane of the pressure-sensitive adhesive layer 22 on the connector flange 20. Suitable retainer means, such as a compliant annular ring 34 protruding radially inwardly from the pressure sleeve 26 is provided to releasably support the attachment 12, with a threaded screw 36 being shown in the drawings by way of example. The lower end of this threaded screw is joined to an enlarged disk-shaped footplate 38 which is thus retained by the retainer ring 34 normally spaced slightly above the pressure-sensitive layer 22, or in any event, without substantial bearing contact with the substrate 14.

In use, of the fixture 10, a suitable quantity of adhesive material 40 such as an epoxy resin or any other suitable adhesive material, is applied to the underside of the footplate 38. Alternately, the adhesive material 40 may be applied directly to a predetermined location on the substrate 14, or to both the footplate and the substrate. The fixture 10 is then temporarily secured onto the substrate 14 at the selected location by removal of the release paper 24 and by pressing the connector flange 20 into secure contact with the substrate 14. During this temporary securement procedure, the pressure sleeve 26 remains in the first position, as viewed in FIG. 4, supporting the attachment footplate 38 spaced from or otherwise out of substantial bearing contact with the substrate 14.

The attachment 12 is then mounted onto the substrate quckly and easily by pressing the pressure sleeve 26 in a direction toward the substrate 14. This motion is permitted by the somewhat resilient nature of the upper and lower spokes 28 and 30, and further by similar resilient structural properties of the outer support cylinder 18 and/or the inner pressure sleeve 26. More particularly, during this motion, the upper and lower spokes 28 and 30 temporarily expand the localized radial dimension between the cylinder 18 and pressure sleeve 26 and then move past over-center positions to a second position shown in FIG. 5 extending radially inwardly from the cylinder 18 with axial components of direction extending toward the connector flange 20. This movement of the spokes is facilitated by shaping the spoke profiles to be relatively thinner at their junctures with the cylinder 18 and the sleeve 26, and further by localized deformation of the support cylinder 18 to a tri-lobe configuration, shown in dotted lines in FIG. 6, as the sets of spokes move past the over-center position. The pressure sleeve may also be sized with a wall thickness to undergo localized deformation as the spokes move over-center.

As the downward pressure sleeve motion displaces the spokes 28 and 30 beyond over-center positions, the deformed support cylinder 18 and/or the pressure sleeve 26 return resiliently to substantially undeformed cylindrical states. This effectively applies hoop stresses to the spokes 28 and 30 which press and maintain the spokes toward the second position as viewed in FIG. 5. Importantly, these hoop stresses act through the spokes to similarly press the pressure sleeve 26 and the attachment carried thereby with a positive force urging the footplate 38 against the substrate 14. Retention forces are thus applied to the adhesive material 40 causing the adhesive material to spread uniformly and in a relatively thin layer between the footplate and substrate. The fixture 10 is allowed to remain in place for a sufficient cure time while applying and maintaining the positive force against the attachment.

In accordance with one aspect of the invention, the upper and lower sets of spokes 28 and 30 cooperate to maintain the pressure sleeve 26 in generally coaxial alignment throughout pressure sleeve movement between the first and second positions. That is, the set of upper spokes 28 cooperate to maintain an upper region of the pressure sleeve 26 in coaxial relation to the support cylinder 18, whereas the three lower spokes 30 similarly cooperate to maintain a lower region of the pressure sleeve in a coaxial orientation within the support cylinder 18. These dual sets of spokes thus selectively prevent significant angular cocking of the pressure sleeve and thereby maintain the attachment 12 oriented for movement substantially perpendicularly to the substrate and for footplate engagement substantially flush with the substrate. When the second pressure sleeve position is reached, the positive force maintaining the footplate against the substrate is substantially uniformly distributed to insure substantially uniform adhesive material distribution and cure strength, thereby providing optimum bonding with the substrate.

Upon sufficient curing of the adhesive material 40, the fixture 10 can be removed quickly and easily from the attachment 12 and the substrate 14. More specifically, with reference to FIG. 7 the fixture 10 can be lifted manually from the substrate 14 in the direction of arrow 42 to break the temporary adherence between the pressure-sensitive adhesive layer 22 on the connector flange 20 and the substrate 14. Removal of the fixture 10 is performed after the adhesive material 40 reaches a bonding strength exceeding the adherence forces of the pressure-sensitive layer and further exceeding any retention forces acting between the retainer ring 34 and the threaded screw 36. The fixture 10 can thus be separated from the attachment leaving the attachment in place on the substrate, as viewed in FIG. 3.

In accordance with one modified form of the invention, as shown in FIG. 8, the fixture 10 can be formed with a modified connector flange 20' for facilitated fixture removal from a substrate after curing of the adhesive material 40. In this modified form, which can be otherwise identical with the embodiment shown in FIGS. 1-7, the connector flange 20' is formed to include a spiral score 44 of reduced material thickness leading from the outer periphery of the flange to a point at or near the periphery of the support cylinder 18. A pull tab 46 at the outer extent of the spiral score 44 is not temporarily adhered to the substrate during fixation of an attachment 12 but is easily grasped upon adhesive material curing to lift the connector flange 20' from the substrate 14 as an elongated strip while tearing the flange along the score 44. The fixture is thus easily removed from the substrate 14 with minimal stresses applied to the substrate, thereby minimizing risk of damage to the substrate.

A further alternative form of the invention is illustrated in FIG. 9. In this embodiment, a modified fixture 110 includes a support frame 116 including an outer support cylinder 118 carrying a lower connector flange 120 and joined integrally by a single set of preferably three equally spaced inwardly radiating spokes 128 to an inner pressure sleeve 126. A lower retainer ring 134 on the pressure sleeve 126 carries an attachment 12, such as a threaded screw 36 with a lower footplate 38. In the first or normal position, these spokes 128 extend in the axial direction at least slightly away from the connector flange 120 to support the attachment out of substantial bearing contact with the substrate, all as previously described with respect to FIGS. 1-7.

In the embodiment of FIG. 9, the underside of the connector flange 120 supports a ring 48 of resilient foam or the like which is attached thereto in any suitable manner, as by use of a pressure-sensitive adhesive layer. A second pressure-sensitive adhesive layer 122 is applied to the underside of the foam ring 48 and a sheet of protective release paper 124 conveniently overlies the layer 122 prior to use. Alternately, the foam ring 48 can be omitted, if desired.

The fixture 110 is used generally as described with respect to the fixture 10 by removing the release paper 124 and temporarily adhering the foam ring 48 together with the connector flange 120 onto a substrate. The inner pressure sleeve 126 is then pressed toward the substrate to move the spokes 128 beyond an over-center condition with the attachment pressed firmly against the substrate. While the single set of spokes 128 may not necessarily maintain precise angular orientation of the attachment relative to the substrate, the support frame 116 is nevertheless adapted for one-piece construction and will provide sufficient attachment orientation for many applications.

Still another embodiment of the invention is shown in FIG. 10, wherein an improved fixture 210 is shown having a construction corresponding with the fixture 10 in FIGS. 1-7, except that the upper set of spokes 28 (FIG. 1) are replaced by alternative guide means for maintaining the orientation of the pressure sleeve 26 relative to a substrate. More specifically, as shown in FIG. 10, a set of preferably three equally spaced spacer fins 50 are formed on the pressure sleeve 26 near the upper end thereof. These spacer fins 50 have radially outer edges 50' positioned for close sliding engagement with the inner surface of the outer support cylinder 18. Accordingly, the spacer fins 50 maintain an upper region of the pressure sleeve generally coaxially within the outer cylinder 18 and cooperate with the lower spokes 30 to maintain the pressure sleeve orientation coaxially within the cylinder 18 during pressure sleeve movement toward a substrate (not shown in FIG. 10), as previously described with respect to FIGS. 1-7. Alternately, the spacer rings 50 may be formed on the support cylinder 18 for sliding contact with the pressure sleeve 26, or substituted into the fixture in lieu of the lower set of spokes 30 while leaving the upper spokes 28 intact.

Any one of the fixture embodiments described hereinabove is adaptable for high volume production, for example, by chain or roll molding to provide a plurality of the fixtures interconnected to each other by lightweight, breakaway runners 60, as viewed in FIG. 11 with respect to a plurality of the fixtures 10. In this form, the fixtures can be installed in rapid sequence through the use of automated or semi-automated power tool equipment.

More specifically, as shown in FIGS. 12 and 13, an elongated magazine or roll of the fixtures 10 interconnected by runners 60 can be fed to an installation head 62 of an automatic installation machine, or a manually held power installation tool or the like. This machine or implement can be provided with an applicator 64 having a head 65 of any suitable design for applying adhesive material to the underside of an attachment carried by each fixture 10 as it is advanced in succession, for example, by a drive roller 66 or the like. The fixtures are then advanced further into association with a two-part punch 68. As shown in FIGS. 12 and 13, an outer punch piece 70 is initially advanced to push the underlying fixture downwardly through an opening 72 in a die plate 74 thereby severing the fixture from the breakaway runners 60 and pressing the fixture firmly against a substrate 14. In automated machinery, the substrate 14 can be carried in turn by suitable conveyor means (not shown) for appropriate advancement past the installation head 62.

With the fixture 10 secured onto the substrate, an inner punch piece 76 can be advanced, as shown in FIG. 13, to displace the inner pressure sleeve 26 from the first position to the second position. This moves the attachment 12 carried by the pressure sleeve of the fixture 10 into engagement with the substrate 14, while the spokes (not shown in FIG. 13) function to apply a positive force urging the attachment firmly against the substrate for the duration of an adhesive material cure period.

The improved fixture of the present invention is thus adapted for cost-efficient, high volume production, preferably as a one-piece plastic molding. The fixture is designed for rapid temporary securing to a substrate followed by quick and easy movement of the pressure sleeve to a position urging the attachment with a positive force against the substrate. In some embodiments, means are provided for maintaining attachment orientation relative to the substrate, and means can be provided to facilitate fixture removal from a substrate subsequent to attachment installation.

A variety of modifications and improvements to the improved fixture 10 and the adhesive attachment 12 carried thereby are believed to be apparent to those skilled in the art. Accordingly, no limitation is intended by way of description herein, except as set forth in the appended claims.

What is claimed is:

1. A fixture for use in securing an attachment to a substrate, comprising:
   a support frame formed as a one-piece component, said support frame including connector means for releasable securement to the substrate, retainer means for releasably carrying the attachment, and means supporting said retainer means for movement relative to said connector means between a first position with the attachment supported substantially out of bearing engagement with the substrate when said connector means is secured to the substrate and a second position urging the attachment with a positive force into bearing engagement with the substrate.

2. The fixture of claim 1 further including temporary securement means for temporarily securing said connector means to the substrate.

3. The fixture of claim 2 wherein said temporary securement means comprises a layer of a pressure-sensitive adhesive applied to said connector means.

4. The fixture of claim 3 further including a sheet of release paper overlying said pressure-sensitive adhesive layer.

5. A fixture for use in securing an attachment to a substrate, comprising:
   a support frame formed as a one-piece component to include an outer support cylinder, a radially enlarged connector flange generally at one end of said support cylinder, an inner retainer member including means for releasably carrying the attachment, and over-center means connected between said support cylinder and said retainer member, said over-center means being movable between a first position with the attachment supported substantially out of bearing engagement with the substrate when said flange is secured to the substrate and a second position urging the attachment with a positive force into bearing engagement with the substrate.

6. The fixture of claim 5 further including temporary securement means for temporarily securing said connector means to the substrate.

7. The fixture of claim 5 wherein said support frame is formed from a molded plastic material.

* * * * *